(12) United States Patent
Lee, IV

(10) Patent No.: US 7,034,693 B2
(45) Date of Patent: Apr. 25, 2006

(54) SPORT DOG LOCATOR

(75) Inventor: Albert L. Lee, IV, Maryville, TN (US)

(73) Assignee: Radio Systems Corporation, Knoxville, TN (US)

( * ) Notice: Subject to any disclaimer, the term of this patent is extended or adjusted under 35 U.S.C. 154(b) by 17 days.

(21) Appl. No.: 10/643,565

(22) Filed: Aug. 19, 2003

(65) Prior Publication Data

US 2005/0040955 A1 Feb. 24, 2005

(51) Int. Cl.
*G08B 5/22* (2006.01)
(52) U.S. Cl. .............................. 340/573.1; 340/825.49; 200/61.52
(58) Field of Classification Search ............ 340/573.1, 340/573.2, 573.3, 825.49; 200/61.45 R, 200/61.52, 61.53

See application file for complete search history.

(56) References Cited

U.S. PATENT DOCUMENTS

| 3,336,530 A | * | 8/1967 | Sloan et al. ................. 342/386 |
| 4,234,876 A | * | 11/1980 | Murai ...................... 340/573.3 |
| 4,349,809 A | * | 9/1982 | Tomes ........................ 340/440 |
| 4,681,303 A | * | 7/1987 | Grassano .................... 267/113 |
| 4,853,685 A | * | 8/1989 | Vogt .......................... 340/3.1 |
| 5,900,818 A | * | 5/1999 | Lemnell .................. 340/573.3 |
| 6,202,599 B1 | * | 3/2001 | Cutler ........................ 119/859 |

\* cited by examiner

*Primary Examiner*—Jeffery Hofsass
*Assistant Examiner*—Jennifer Stone
(74) *Attorney, Agent, or Firm*—Pitts & Brittian, P.C.

(57) ABSTRACT

Described is a locator device for indicating the relative location of a dog in a sporting field and for indicating whether the dog is tracking or on point regardless of the orientation of the device. The locator device calculates whether a dog is tracking or on point by measuring the intensity of the movement of the dog with a vibration switch and then interpreting the intensity of movement. The vibration switch includes two electrical contacts that are disposed substantially on the longitudinal axis of the vibration switch.

21 Claims, 4 Drawing Sheets

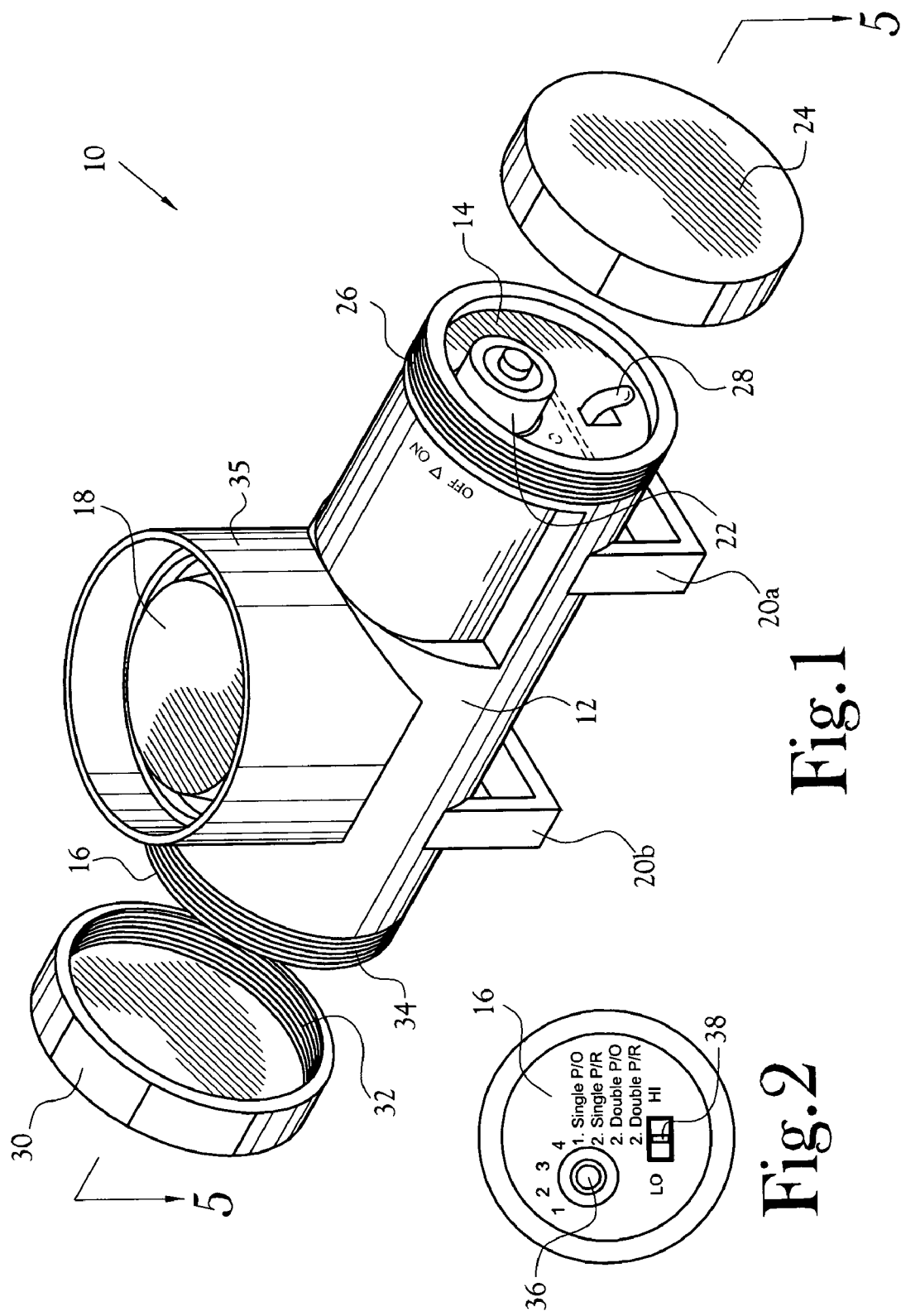

SPORT DOG LOCATOR

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

This invention pertains to a device for indicating the relative location and current behavior of a dog in a sporting field. More particularly, this invention pertains to a device for accurately interpreting and indicating the current behavior of a dog regardless of the orientation of the device.

2. Description of the Related Art

A sporting dog locator is an apparatus typically used by hunters, trainers, and handlers to gain knowledge of the location of a dog that is participating in a sporting event and to gain knowledge of the behavior of the dog in the sporting field. Typical information regarding sporting dog behavior that is of interest to a handler is whether a dog is tracking or on point. Conventional sporting dog locators are carried by a dog and indicate whether the dog is tracking or on point with respective and distinguishable audible signals.

In order to determine whether a dog is tracking or on point, sporting dog locators determine whether the dog is moving or stationary. Conventional sporting dog locators employ vibration responsive switches to detect the intensity of the movement of a dog, and from the intensity of the movement, it is determined whether a dog is moving or stationary. A vibration switch is typically a cylindrical-shaped apparatus that forms an enclosure and contains a free-moving electrically conductive mass member that is in electrical contact with the sidewall of the enclosure. The sidewall of the enclosure is electrically grounded and a single electrical contact is disposed within the enclosure at one end of the cylindrical-shaped switch. When the mass member engages the electrical contact, a circuit is completed and a signal is produced. The frequency at which the signals are produced indicates the intensity of the movement of the equipped dog, thus indicating whether the dog is tracking or on point.

Conventional sporting dog locators are limited in that their vibration switches include only a single electrical contact. A vibration switch of this nature does not operate properly if the orientation of a dog leaves the vibration switch in a position that prevents the mass member from engaging the electrical contact. This incapacitating position occurs when a dog simply raises or lowers his head or travels along a steep incline or decline.

Conventional sporting dog locators are also limited in that their vibration switches typically use a fluid for debouncing or vibration dampening. This requires a vibration switch to include a fluid-tight seal such that the vibration switch retains the fluid that fills the enclosure. Additionally, the fluid slightly restricts the movement of the mass member such that the production of signals due to small and insignificant movement, such as heavy breathing, is eliminated. The inclusion of the fluid-tight seal increases the expenses to produce a vibration switch and ultimately increases the expenses to produce a locator device.

BRIEF SUMMARY OF THE INVENTION

In accordance with the various features of the present invention there is provided a locator device for indicating the relative location of a dog in a sporting field and for indicating whether the dog is tracking or on point regardless of the orientation of the device. The locator device reveals the location of a dog by emitting a substantially loud audible signal such that a handler is able to hear the signal and understand the direction in which the dog is working. The locator device calculates whether a dog is tracking or on point by measuring the intensity of the movement of the dog with a vibration switch and then interpreting the intensity of movement. The vibration switch includes two electrical contacts that are disposed substantially on the longitudinal axis of the vibration switch. Because the vibration switch is positioned within the locator device such that the longitudinal axis of the vibration switch is substantially parallel to the backbone of the dog, the locator device operates as designed regardless of the orientation of the device. The locator device indicates whether a dog is tracking or on point by emitting respective and distinguishable sequences of audible signals.

The locator device includes a vibration switch, a processing device, a sound generating device, and a housing. The housing is carried by a dog and accommodates the remaining components of the locator device. The vibration switch is used to detect the intensity of the movement of a dog. The processing device interprets the intensity of movement to indicate that the dog is tracking or that the dog is on point. A corresponding signal is then transferred by the processing device to the sound generating device, which emits an audible signal that indicates to a handler whether a dog is tracking or on point.

The vibration switch includes an enclosure formed by a cylindrical-shaped housing and two electrical contacts found within the enclosure. One electrical contact is disposed at each end of the housing while the sidewall of the enclosure is electrically grounded. The vibration switch includes an electrically conductive mass member that resides within the enclosure of the vibration switch and remains in substantially continuous electrical contact with the sidewall of the enclosure. When the electrically conductive object contacts either of the electrical contacts disposed at the ends of the housing, a circuit is completed and a signal is produced. The circuit interprets the signal produced by the vibration switch to indicate that the dog is tracking or that the dog is on point.

The vibration switch is disposed within the locator device such that when the device is carried by a dog, the longitudinal axis of the vibration switch is substantially parallel to the backbone of an equipped dog. Because the electrical contacts are positioned at the ends of the cylindrical-shaped housing of the vibration switch, the electrical contacts are positioned along the longitudinal axis of the vibration switch. Understanding the typical movements of a dog, it can be seen that this configuration allows the locator device to operate as designed regardless of the orientation imposed by a dog on the locator device.

BRIEF DESCRIPTION OF THE SEVERAL VIEWS OF THE DRAWINGS

The above-mentioned features of the invention will become more clearly understood from the following detailed description of the invention read together with the drawings in which:

FIG. 1 is an exploded view of a locator device constructed in accordance the with various features of the present invention;

FIG. 2 is an end elevation view of the locator device of FIG. 1 illustrating the controls for adjusting the modes of operation;

DETAILED DESCRIPTION OF THE INVENTION

Figure 3:
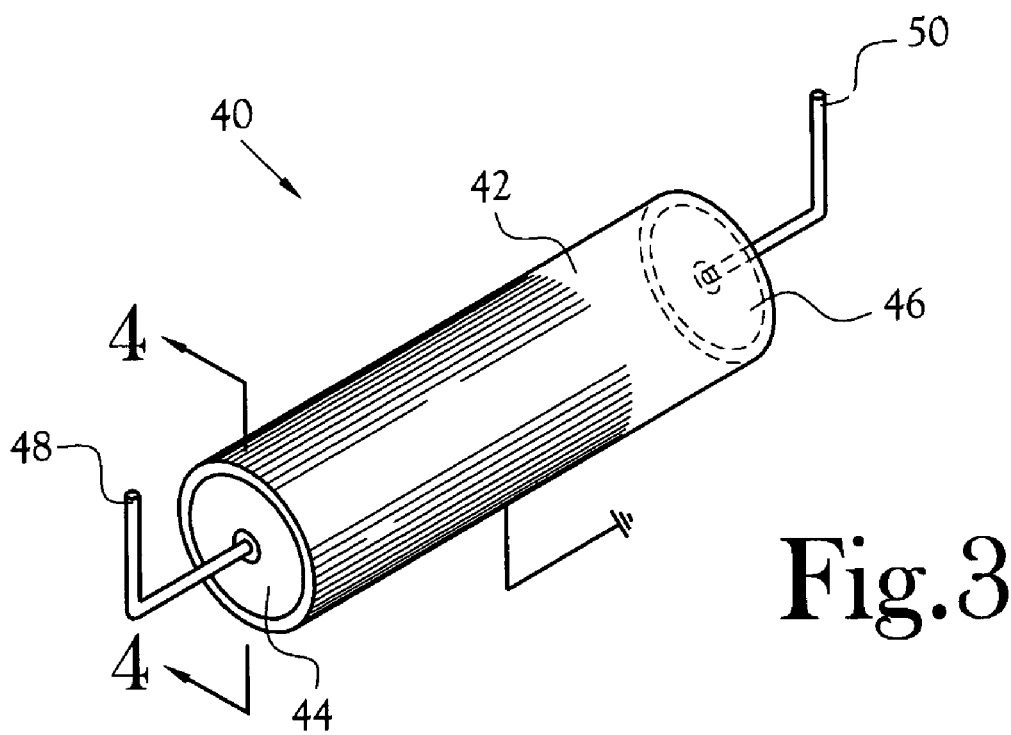
FIG. 3 is a perspective view of a vibration switch constructed in accordance with the various features of the present invention.

One embodiment of a locator device for indicating the relative location of a dog in a sporting field and for indicating whether the dog is tracking or on point regardless of the orientation of the device and constructed in accordance with the various features of the present invention is illustrated generally at 10 in the Figures. The locator device 10 reveals the location of a dog by emitting a substantially loud audible signal such that a handler is able to hear the signal and understand the direction in which the dog is working. The locator device 10 calculates whether a dog is tracking or on point by measuring the intensity of the movement of the dog and interpreting the intensity of movement regardless of the orientation of the locator device 10. The locator device 10 indicates whether a dog is tracking or on point by emitting respective and distinguishable sequences of audible signals.

FIG. 1 illustrates a perspective view of the locator device 10 in accordance with the various features of the present invention. The locator device 10 includes a housing 12, which, in the illustrated embodiment, is a cylindrical-shaped housing that includes a first port 14, a second port 16, a communication device 18, and collar brackets 20. The first port 14 provides an opening that accommodates a power source 22 for powering the circuitry of the locator device 10. The power source 22 of the illustrated embodiment is a conventional 3V battery. The locator device 10 is activated by securing a first lid 24, which in the illustrated embodiment includes a first female threaded portion, to a compatible first male threaded portion 26 that encircles the first port 14. The first lid 24 includes an electrically conductive material disposed on the inside surface of the first lid 24 such that when secured to the first port 14, the electrically conductive material completes a circuit by engaging a contact of the power source 22 and an activation electrical contact 28, thus activating the locator device 10. Those skilled in the art will recognize that other activating mechanisms may be used without departing from the scope or spirit of the present invention.

The second port 16 accommodates the mode of operation controls. A second lid 30 includes a second female threaded portion 32 which is compatible with a second male threaded portion 34 that encircles the second port 16. When the first lid 24 is secured to the first threaded portion 26 and the second lid 30 is secured to the second threaded portion 34, the locator device 10 is sealed such that water or other environmental elements detrimental to the operation of the locator device 10 are unable to enter the locator device 10. Those skilled in the art will recognize that other closures may be used without departing from the scope or spirit of the present invention.

In the illustrated embodiment, the locator device 10 is carried by a dog by way of the collar brackets 20a, 20b. The collar brackets 20a, 20b receive the collar of a dog such that after the collar is inserted through the collar brackets 20a, 20b, the collar is conventionally secured around the dog's neck. When the locator device 10 is attached to a dog, the locator device 10 is positioned on top of the dog's neck. Those skilled in the art will recognize that other ways of attaching the locator device 10 to a dog may be used without departing from the scope of spirit of the present invention.

The handler is alerted to the relative location and behavior of a dog in a sporting field by the signal emitted by the communication device 18. In the illustrated embodiment, the communication device 18 is a sound generating device that emits audible signals that indicate the relative location of a dog and whether the dog is tracking or on point. In the illustrated embodiment, the communication device 18 is located within a cylindrical extension 35 disposed on the housing 12 opposing the collar brackets 20 with regard to the housing 12 such that when the locator device 10 is attached to a dog, the audible signal is directed away from the dog's head.

Another embodiment of the locator device 10 includes alerting the handler to the relative location and behavior of a dog in a sporting field by way of a communication device 18 that transmits a signal from the locator device 10 to a corresponding receiver that is accessible by the handler. The receiver displays the relative location of the dog and indicates whether the dog is tracking or on point. Those skilled in the art will recognize that other ways of indicating the location and behavior of dog to a handler may be used without interfering with the scope and spirit of the present invention.

Those skilled in the art will recognize that the previously described locator device 10 is only one embodiment of the present invention. The shapes, positions, and quantities of the aforementioned components may vary without departing from the scope or spirit of the present invention.

FIG. 2 illustrates a side elevation view of the second port 16 of the locator device 10. The second port 16 accommodates the mode of operation controls, which, in the illustrated embodiment, include a mode switch 36 for setting the desired mode of operation and a volume switch 38 for adjusting the volume of the audible signal emitted by the communication device 18. In the illustrated embodiment, the mode switch 36 is a rotary switch that allows a handler to select from the offered modes of operation and the volume switch 38 is a toggle switch that allows a handler to select a volume setting of HI or LO. The modes of operation offered by the locator device 10 of the illustrated embodiment include: 1) indicating that a dog is on point with a single beep, 2) indicating that a dog is on point with a single beep and that a dog is tracking with a single beep that is distinguishable from the single beep associated with a dog being on point, 3) indicating that a dog is on point with a double beep, and 4) indicating that a dog is on point with a double beep and that a dog is tracking with a double beep that is distinguishable from the double beep associated with a dog being on point. The double beeping modes are implemented such that two locator devices 10 can be used simultaneously while maintaining a differentiation between the equipped dogs. The described modes of operation apply to only one embodiment of the present invention, hence, other modes of operation may be used without departing from the scope or spirit of the present invention.

Those skilled in the art will recognize that other switches may be used for the mode switch 36 and the volume switch 38 without departing from the scope or spirit of the present invention. Additionally, those skilled in the art will recognize that controls other than the described mode of operation controls may be used without departing from the scope or spirit of the present invention.

FIG. 3 illustrates a perspective view of a vibration switch 40 in accordance with features of the present invention. The vibration switch 40 of the illustrated embodiment includes a cylindrically-shaped and electrically grounded sidewall 42. A first switch cap 44 and a second switch cap 46 are disposed at opposing ends of the sidewall 42 such that an enclosure is formed within the sidewall 42. Additionally, the first switch cap 44 and the second switch cap 46 are electrical insulators. A first conductive wire 48 is electrically connected to the vibration switch 40 at the first switch cap 44 and a second conductive wire 50 is electrically connected to the vibration switch 40 at the second switch cap 46. The first conductive wire 48 and the second conductive wire 50 electrically connect the vibration switch 40 to the main circuitry of the locator device 10.

Figure 4:
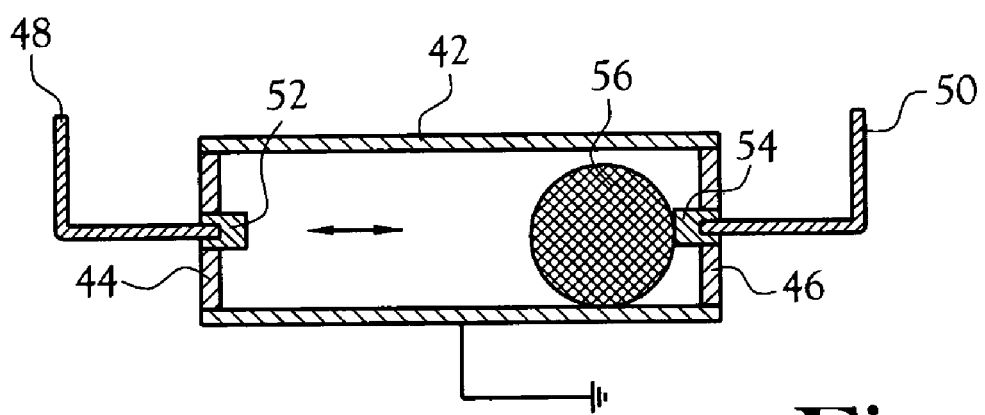
FIG. 4 is a side elevation view of the vibration switch of FIG. 3 in section, taken along lines 4—4.

FIG. 4 is a side elevation view of the vibration switch 40 of FIG. 3 in section, taken along lines 4—4. A first electrical contact 52 is disposed within the enclosure at the first switch cap 44 and is in electrical communication with the first conductive wire 48. Similarly, a second electrical contact 54 is disposed within the enclosure at the second switch cap 46 and is in electrical communication with the second conductive wire 50. The first electrical contact 52 and the second electrical contact 54 are electrically isolated from the sidewall 42 by the first switch cap 44 and the second switch cap 46, respectively. The vibration switch 40 includes an electrically conductive mass member 56, which in the illustrated embodiment is a sphere that is sized slightly smaller than the cylindrical enclosure such that the mass member 56 moves without restriction within enclosure while remaining in substantially continuous electrical contact with the sidewall 42. Because the sidewall 42 is electrically grounded and the mass member 56 is electrically conductive and in electrical contact with the sidewall 42, the engagement of the mass member 56 and either the first electrical contact 52 or the second electrical contact 46 closes the switch, which produces a signal that is transferred to the remaining circuitry of the locator device 10.

Figure 5:
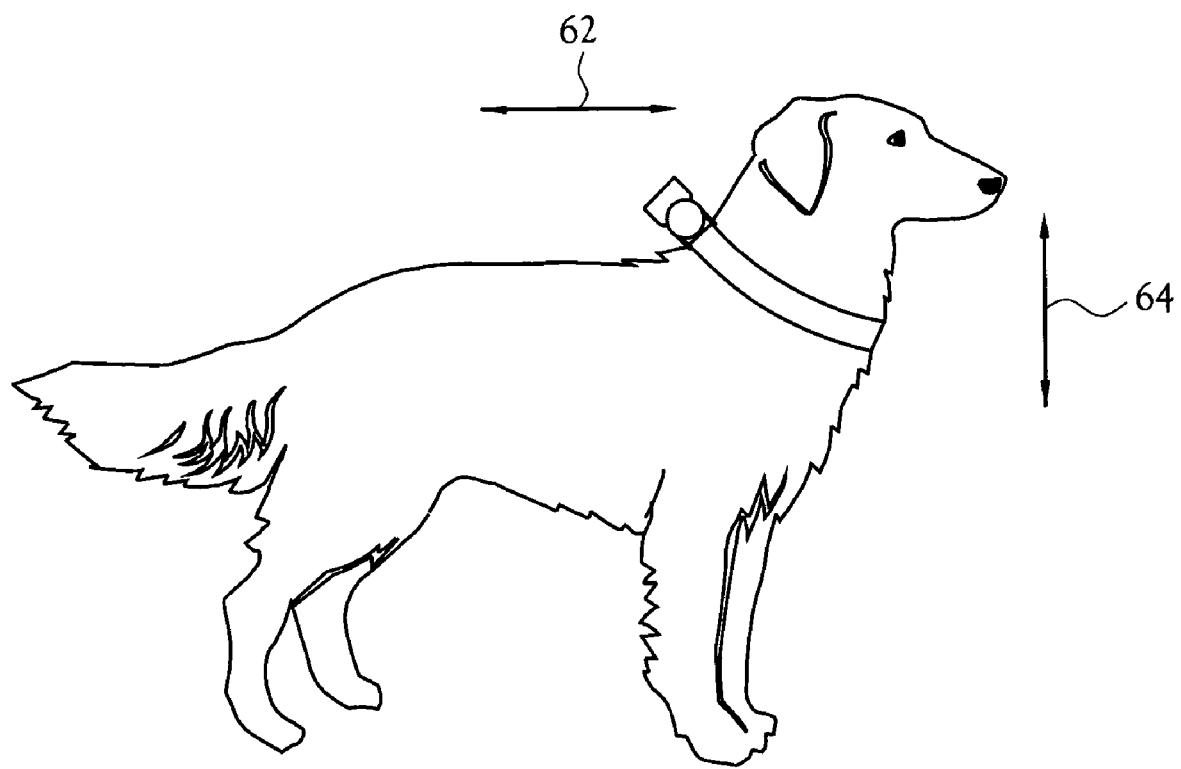
FIG. 5 is a top plan view of the locator device of FIG. 1 in section, taken along lines 5—5.

FIG. 5 is an illustration of a dog wearing the locator device 10 illustrating the directions of the forces applied to the locator device 10 due to the motions of a dog in a sporting field. It is understood that the motions of a dog in the sporting field are typically in a longitudinal direction 62 and in a vertical direction 64, thus, the directions of the forces on the locator device 10 are typically in the longitudinal direction 62 and the vertical direction 64.

Figure 6:
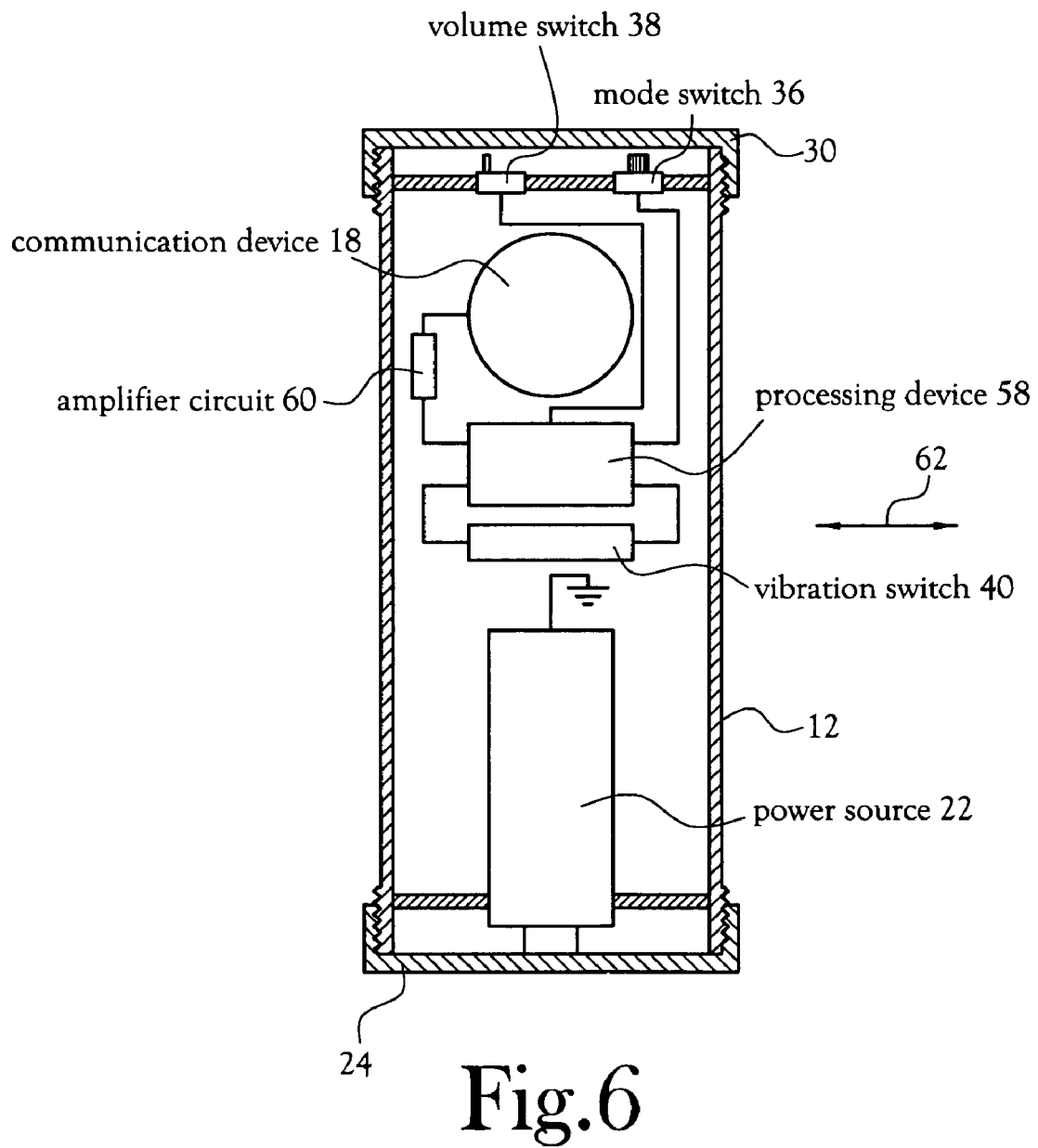
FIG. 6 is an illustration of a sporting dog wearing the locator device of FIG. 1 illustrating the directions of typical movement of a dog in the sporting field.

FIG. 6 is a top plan view of the locator device 10 in section, taken along lines 5—5 of FIG. 1, illustrating a pictorial block diagram of the circuitry of the present invention. A processing device 58 is in electrical communication with the mode switch 36, the volume switch 38, the vibration switch 40, and an amplifier circuit 60 that conditions signals for the communication device 18. The processing device 58 reads the condition of the mode switch 36 and the condition of the volume switch 38 to determine the manner in which to represent the behavior of an equipped dog. The processing device 58 then reads the signals produced by the vibration switch 40 to establish the actual behavior of the dog.

The vibration switch 40 is positioned within the housing 12 such that the longitudinal axis of the vibration switch 40 is substantially parallel to the backbone of an equipped dog. This orientation allows the vibration switch 40 to operate as designed regardless of the orientation of the locator device 10 imposed by the dog. The vibration switch 40 indicates the behavior of the dog by indicating the intensity of the movement of the dog. For example, as a dog is running, or tracking, the locator device 10 moves intensely. Consequently, the vibration switch 40 is proportionally agitated, causing the mass member 56 to contact the first electrical contact 52 and the second electrical contact 54 at a relatively high frequency. The processing device 58 reads the high frequency of signals and interprets the high frequency to mean the dog is tracking. Similarly, when a dog is on point, the locator device 10 barely moves. Consequently, the vibration switch 40 is barely agitated, allowing the mass member 56 to rest on one of the electrical contacts. The processing device 58 reads the constant signal and interprets the signal to mean the dog is on point.

As the processing device 58 reads the signals produced by the vibration switch 40, the processing device 58 performs the task of debouncing. Debouncing is the elimination of the realization of the multiple engagements by the mass member 56 and either the first electrical contact 52 or the second electrical contact 54 during the closing of the vibration switch 40 due to bouncing, thus a single signal is revealed for the closing of the vibration switch 40. Debouncing for the vibration switch 40 is also translated to be the elimination of the realization of signals produced by the small and insignificant movements of a dog that is on point. The insignificant movements include the panting of the dog, the heartbeat of the dog, or the twitching of the muscles of the dog. Because the processing device 58 performs the task of debouncing, it is not necessary for the vibration switch 40 to be fluidly sealed and filled with a fluid.

Once the signal from the vibration switch 40 has been read by the processing device 58 and the signal has been debounced, the processing device 58 sends a signal that corresponds to the condition of the mode switch 36, that corresponds to the condition of the volume switch 38, and that corresponds to the frequency of the signal of the vibration switch 40 to an amplifier circuit 60. The amplifier circuit 60 conditions the signal to be received by the communication device 18, which emits the signal in the form of an audible signal that indicates to a handler whether the equipped dog is tracking or on point.

Considering the multiple electrical contact design of the vibration switch 40 and the orientation of the vibration switch 40 within the locator device 10 and the orientation of the locator device 10 when attached to a dog and the typical motions of a dog in the sporting field, it is understood that the locator device 10 operates as designed regardless of the orientation of the device imposed by the dog.

Those skilled in the art will appreciate the circuit in FIG. 6 is not intended to show every component or interconnection. For example power supply lines and regulation, trim, and filtering components are omitted but their use and implementation will be understood by those skilled in the art.

From the foregoing description, those skilled in the art will recognize that a device for indicating the relative location and behavior of a dog in a sporting field offering advantages over the prior art has been provided. The device provides a vibration switch for detecting the intensity of the movement of a dog which is then translated to the behavior of the dog which is presented to a handler by an audible signal. Further, the device provides a vibration switch including two electrical contacts that allows the device to operate as designed regardless of the orientation of the device.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

We claim:

1. A locator device for indicating the relative location and behavior of a dog in a sporting field, said locator device comprising:
   a housing carried by a strap worn by a dog;
   a vibration switch disposed within said housing, said vibration switch comprising an enclosure whose sidewall is electrically conductive, said vibration switch comprising a mass member that is electrically conductive and disposed within said enclosure, said vibration switch comprising a first electrical contact disposed within said enclosure and a second electrical contact disposed within said enclosure, said first electrical contact and said second electrical contact electrically insulated from said sidewall; and
   a communication device responsive to said vibration switch.

2. The locator device of claim 1 further comprising a processing device in electrical communication with said vibration switch and said communication device, said processing device activating said communication device in response to said vibration switch.

3. The locator device of claim 2 wherein said processing device performs the task of debouncing.

4. The locator device of claim 1 wherein said sidewall of said enclosure of said vibration switch is electrically grounded.

5. The locator device of claim 1 wherein said vibration switch does not include a fluid-tight seal.

6. The locator device of claim 1 wherein said vibration switch includes a fluid-tight seal.

7. The locator device of claim 1 wherein said communication device is a sound generating device.

8. The locator device of claim 1 wherein said communication device comprises a transmitter/receiver combination, whereby said receiver is accessible by a handler.

9. The locator device of claim 1 wherein said housing includes a collar bracket that receives a dog's collar such that said locator device is carried by the dog.

10. A locator device for indicating the relative location and behavior of a dog in a sporting field, said locator device comprising:
    a housing carried by a strap worn by a dog;
    a vibration switch disposed within said housing, said vibration switch is oriented such that the longitudinal axis of said vibration switch is substantially parallel to the backbone of an equipped dog, said vibration switch comprising an enclosure whose sidewall is electrically conductive, said vibration switch comprising a mass member that is electrically conductive and disposed within said enclosure, said vibration switch comprising a first electrical contact disposed within said enclosure and a second electrical contact disposed within said enclosure, said first electrical contact and said second electrical contact electrically insulated from said sidewall; and
    a communication device responsive to said vibration switch.

11. The locator device of claim 10 wherein said first electrical contact and said second electrical contact are disposed substantially on the longitudinal axis of said vibration switch.

12. A locator device for indicating the relative location and behavior of a dog in a sporting field, said locator device comprising:
    a housing carried by a strap worn by a dog;
    a vibration switch disposed within said housing, said vibration switch comprising a first electrical contact and a second electrical contact and an enclosure, said first electrical contact disposed at a first end of said enclosure, said second electrical contact disposed on an opposing second end of said enclosure, said first electrical contract and said second electrical contact are further substantially disposed on the longitudinal axis of said vibration switch, whereby the longitudinal axis of said vibration switch is substantially parallel to the backbone of the equipped dog; and
    a communication device that is responsive to said vibration switch.

13. The locator device of claim 12 further comprising a processing device in electrical communication with said vibration switch and said communication device, said processing device activating said communication device in response to said vibration switch.

14. The locator device of claim 13 wherein said processing device performs the task of debouncing.

15. The locator device of claim 12 wherein said sidewall of said enclosure of said vibration switch is electrically grounded.

16. The locator device of claim 12 wherein said vibration switch does not include a fluid-tight seal.

17. The locator device of claim 12 wherein said vibration switch includes a fluid-tight seal.

18. The locator device of claim 12 wherein said communication device is a sound generating device.

19. The locator device of claim 12 wherein said communication device comprises a transmitter/receiver combination, whereby said receiver is accessible by a handler.

20. The locator device of claim 12 wherein said housing includes a collar bracket that receives a dog's collar such that said locator device is carried by the dog.

21. A locator device for indicating the relative location and behavior of a dog in a sporting field, said locator device comprising:
    a housing carried by a dog;
    a vibration switch disposed within said housing, said vibration switch comprising:
        an enclosure having a sidewall, a first end, and a second end, said sidewall being electrically conductive,
        a mass member contained within said enclosure, said mass member free to move within said enclosure, said mass member being electrically conductive,
        a first electrical contact disposed proximate to a first end of said enclosure, said first electrical contact electrically isolated from said sidewall, said first electrical contact and said sidewall being placed in electrical communication when said mass member engages said first electrical contact, and a second electrical contact disposed proximate to a second end of said enclosure, said second electrical contact electrically isolated from said sidewall, said second electrical contact and said sidewall being placed in electrical communication when said mass member engages said second electrical contact, and a communication device responsive to said vibration switch.

* * * * *